(12) United States Patent
Aue et al.

(10) Patent No.: US 8,097,807 B2
(45) Date of Patent: Jan. 17, 2012

(54) APPARATUS FOR A JUNCTION POINT BETWEEN TWO ELECTRICAL HIGH-VOLTAGE CABLES

(75) Inventors: Volker Aue, Dortmund (DE); Manfred Baesch, Oberhausen (DE); Jozef Cardinaels, Wetteren (BE)

(73) Assignee: Nexans, Paris (FR)

( * ) Notice: Subject to any disclaimer, the term of this patent is extended or adjusted under 35 U.S.C. 154(b) by 358 days.

(21) Appl. No.: 12/362,555

(22) Filed: Jan. 30, 2009

(65) Prior Publication Data

US 2009/0277685 A1 Nov. 12, 2009

(30) Foreign Application Priority Data

Feb. 13, 2008 (EP) .................................... 08290146

(51) Int. Cl.
*H01R 4/00* (2006.01)
(52) U.S. Cl. .................. 174/84 R; 174/88 R; 174/94 R
(58) Field of Classification Search ................ 174/74 R, 174/78, 84 R, 88 R, 89, 90, 92, 94 R
See application file for complete search history.

(56) References Cited

U.S. PATENT DOCUMENTS

| | | | | | |
|---|---|---|---|---|---|
| 3,656,084 | A | * | 4/1972 | Malia | 439/88 |
| 4,006,288 | A | * | 2/1977 | Stevens | 174/73.1 |
| 4,034,151 | A | * | 7/1977 | Silva et al. | 174/73.1 |
| 4,099,021 | A | * | 7/1978 | Venezia | 174/73.1 |
| 4,144,404 | A | * | 3/1979 | De Groef et al. | 174/88 C |
| 4,179,583 | A | * | 12/1979 | Sergev | 174/21 R |
| 4,252,992 | A | * | 2/1981 | Cherry et al. | 174/90 |
| 4,362,352 | A | * | 12/1982 | Hawkins et al. | 439/788 |
| 5,278,353 | A | * | 1/1994 | Buchholz et al. | 174/84 R |
| 5,408,047 | A | * | 4/1995 | Wentzel | 174/73.1 |
| 6,364,721 | B2 | * | 4/2002 | Stewart, III | 439/784 |
| 2004/0099434 | A1 | * | 5/2004 | Balconi et al. | 174/88 R |

FOREIGN PATENT DOCUMENTS

| | | |
|---|---|---|
| EP | 1158638 | 11/2001 |
| GB | 1339502 | 12/1973 |

* cited by examiner

*Primary Examiner* — William Mayo, III
(74) *Attorney, Agent, or Firm* — Sofer & Haroun, LLP

(57) ABSTRACT

Apparatus for a connecting point between high-voltage cables, each cable having a conductor, inner conductive layer, insulation, outer conductive layer, and a sheath over the outer conductive layer and in which the conductors, from which the surrounding layers have been removed, are conductively connected to one another. The arrangement has electrical screening elements and an integral elongated sleeve body, composed of elastic insulating material and a through-hole. The sleeve body has at its axial ends, which are intended for the cable to pass through, electrical control funnels which abut the outer conductive layers, from which the sheaths have been removed. The internal diameters of the through-hole in the sleeve body, at its axial ends, are for its use in a connecting point of cables, having an external diameter of their insulation which differs by at least 10 mm, different in a defined manner and adapted to the different external diameters.

5 Claims, 1 Drawing Sheet

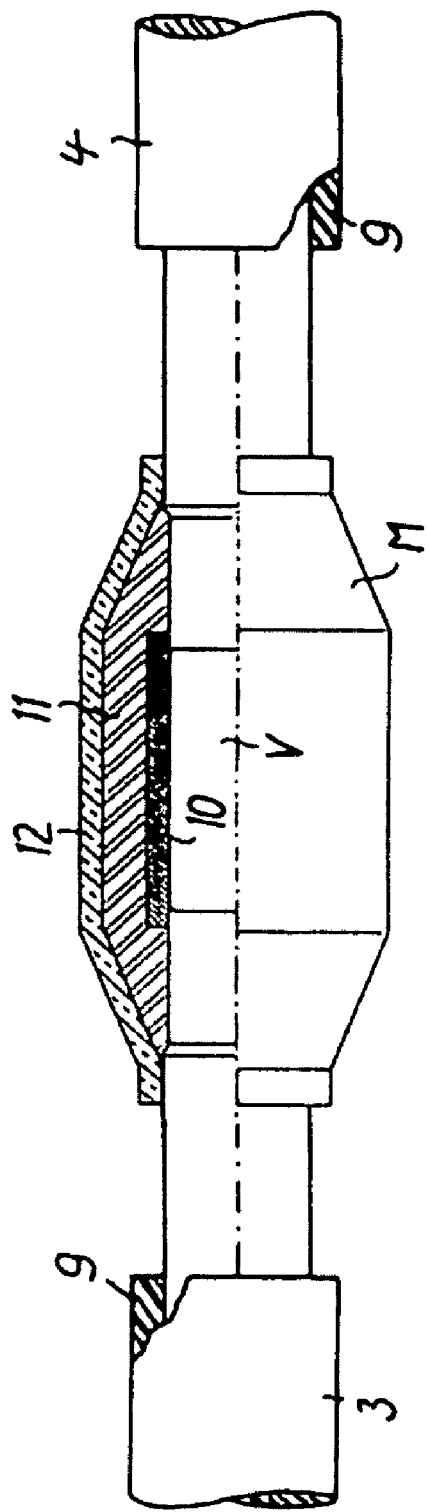
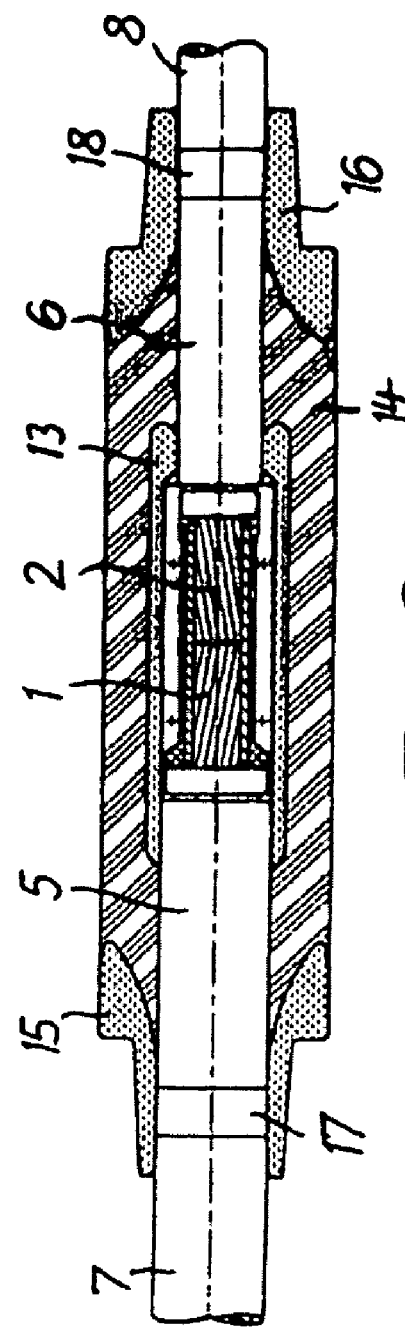

ing medium, for example with SF6 gas or insulating oil. The complexity for the connection of cables such as these is correspondingly high.

APPARATUS FOR A JUNCTION POINT BETWEEN TWO ELECTRICAL HIGH-VOLTAGE CABLES

RELATED APPLICATION

This application claims priority to European Patent Application No. 08290146.3, filed on Feb. 13, 2008, the entirety of which is incorporated by reference.

BACKGROUND

1. Field of the Invention

The invention relates to an apparatus for a junction point between two electrical high-voltage cables.

2. Description of Prior Art

GB-A-1 339 502 describes a connecting apparatus for two screened electrical high-voltage cables in which the conductors of the two high-voltage cables are electrically conductively connected to one another by means of a metallic clamping connector. Flexible tube sections are fitted over the screens thereof and are joined together integrally from an electrically conductive and an electrically non-conductive polymer material. The entire junction point is surrounded by a sleeve body which is composed of two parts, each of which lies over one of the two high-voltage cables. The two parts of the sleeve body are plugged together in a moisture-tight manner in the central area of the connecting apparatus. If the two high-voltage cables have different diameters, the parts of the sleeve body remain unchanged. Matching to the respective diameters is carried out via the flexible tube sections, which may have different internal dimensions, with their outer surface remaining the same.

The known apparatus according to the initially cited EP 1 158 638 B1 relates essentially to the electrically conductive connection of the conductors of two high-voltage cables. An electrically highly conductive metallic tube is arranged over the two stripped ends of the conductors, which are aligned with one another, and is mechanically firmly connected to the two conductors. The junction point of the two conductors is surrounded by a sleeve body which is in the form of a prefabricated, integral component composed of elastomer material, such as silicone rubber, in which a conductive screen for the junction point of the conductors of the two cables is embedded. At each of the two mutually opposite ends, this has a through-hole, which is provided with a control funnel, for the two cables to pass through. Before the conductors are connected, the sleeve body is pushed with widened through-holes onto one of the cables and is "parked" there. Once the connection has been completed, it is moved to the fitted position, in which it surrounds the junction point of the two conductors and the adjacent ends of the insulation, which is provided with the outer conductive layer, of the two conductors with an interference fit. This known apparatus is used for cables with insulation having the same external diameters, which fluctuate only within the range of manufacturing tolerances. It cannot be used to connect cables whose insulation has widely different external diameters. Connections such as these are required, for example, between so-called pipe-type cables and underground cables, or between underwater cables and land cables. In the case of cables such as these, end terminations are fitted using known technology to the ends of the two cables, are placed opposite one another in a metallic housing, and are electrically conductively connected to one another. For electrical insulation, the housing is filled with an insulating medium, for example with SF6 gas or insulating oil. The complexity for the connection of cables such as these is correspondingly high.

SUMMARY

The invention is based on the object of designing the apparatus as described initially in a simpler form.

When using this sleeve body, the simple and advantageous connection technique, for example as is described in the initially cited EP 1 158 638 B1, can also be used for two high-voltage cables whose insulation has a considerably different diameter. The internal diameters of the two openings, which are provided at the ends of the sleeve body, of the through-hole are of such a size that they can on the one hand be pushed onto one of the cables, before the through-connection of the two conductors, without any risk of overstraining them. On the other hand, the sleeve body is pressed with a defined force against the outer conductive layers at both ends with the control funnels that are located there, despite the greatly different external diameters of the insulation on the two cables, to be precise with at least approximately the same force on both cables. This is of major importance for the functionality of the sleeve body because the defined sizes of the ends of the through-hole allow this to be done without damage, in particular in the event of temperature fluctuations, such as those which occur during operation of a cable run.

The differences between the internal diameters of the two ends of the through-hole advantageously correspond to the differences in the external diameters of the insulation on the two cables.

BRIEF DESCRIPTION OF THE DRAWINGS

One exemplary embodiment of the subject matter of the invention is illustrated in the drawings, in which:

FIG. 1 shows, schematically, the basic design of a junction point between two high-voltage cables, in the form of a section, and FIG. 2 shows a section through an apparatus according to the invention.

DETAILED DESCRIPTION

The conductors 1 and 2, which can be seen in FIG. 2, of two high-voltage cables 3 and 4—referred to in the following text as "cables 3 and 4"—are electrically conductively connected to one another at a junction point V. The conductors 1 and 2 may have a number of strands or may be solid. They may also be round or segmented. They may be composed of copper or aluminium. The conductors 1 and 2 are each surrounded by an inner conductive layer, which is also referred to as conductor smoothing. This conductive layer, which contains soot particles by way of example, is not shown in the drawing.

Extruded insulation 5 and 6 is respectively fitted over the inner conductive layer and is surrounded by a respective outer conductive layer 7 and 8. The outer conductive layers 7 and 8 may be formed in precisely the same way as the inner conductive layers. Further layers of the respective cables 3 and 4 can be arranged above the outer respective conductive layer 7 or 8, and these further layers are surrounded by an outer sheath 9 composed of insulating material.

A sleeve M is fitted over the junction point V, as a prefabricated component comprising a conductive screen 10 and a moulding 11 composed of elastic insulating material, on which a conductive outer coating 12 is fitted. The coating 12 makes electrically conductive contact with the outer conductive layers 7 and 8 of the two cables 3 and 4, surrounding their insulation 5 and 6. Crosslinked polyethylene is preferably used as the material for the insulation 5 and 6. The sleeve M is seated on the parts surrounded by it, with an interference fit.

The apparatus according to the invention is illustrated in the form of an exemplary embodiment in FIG. 2. It connects two cables 3 and 4 whose insulation 5 and 6 has greatly different external diameters. The external diameter of the insulation 6 should, for example, be at least 10 mm less than the external diameter of the insulation 5. The conductors 1 and 2 of the two cables 3 and 4 in the illustrated exemplary embodiment have the same dimensions and they are constructed identically. However, they may also have different dimensions with correspondingly different or adapted thickness of the insulation 5 and 6. A screening electrode 13 is arranged around the junction point between the two conductors 1 and 2 and is designed at its ends such that it rests on the insulation 5 and 6 on both cables.

The entire junction point is surrounded by a sleeve body 14 composed of permanently elastic insulating material at whose two ends a respective control funnel 15 or 16 is fitted. The sleeve body 14 is advantageously composed of an ethylene-propylene-terpolymer (EPDM) or of silicone rubber. The control funnels 15 and 16 are integrated in the sleeve body 14 and are advantageously composed of the same material as the sleeve body 14, and are made electrically conductive. The control funnels 15 and 16 lie with a defined interference fit on the respective outer conductive layer 7 and 8 of the two cables 3 and 4.

The "character" of the sleeve body 14 is matched to the different external diameters of the insulation 5 and 6 and to the screening electrode 13.

It has a through-hole whose profile is stepped and which, at its two axial ends, has internal diameters which likewise are greatly different, in the same way as the external diameters of the insulation 5 and 6 on the two cables 3 and 4. The difference between the internal diameters at the ends of the through-hole is advantageously likewise at least 10 mm—matching that of the insulation 5 and 6. The internal diameters of the openings at the ends of the through-hole in the sleeve body 14 are designed in a defined manner such that the sleeve body 14, to be precise its control funnels 15 and 16, rest with a predetermined interference fit on the outer conductive layers 7 and 8 of the two cables 3 and 4. When the sleeve body 14 is in the rest state, they are advantageously smaller in size than the external diameters of the insulation 5 and 6 such that they must be widened by at least 8% in order to rest sufficiently firmly on the conductive layers 7 and 8 in the fitted position. An upper limit for the required widening of the through-hole at the ends of the sleeve body 14 is 33%.

The procedure for fitting the apparatus according to the invention is, for example, as follows:

The sheaths 9 are removed over a predetermined length at the ends of the two cables 3 and 4. The outer conductive layers 7 and 8 exposed in this way are then likewise removed, to be precise over a length corresponding to the length of the sleeve body 14. The ends of the outer conductive layers 7 and 8 in this case merge with a conical transition at the points 17 and 18 onto the respective insulation 5 and 6, as can be seen from FIG. 2. The insulation 5 and 6 and the inner conductive layers are then removed from the ends of the two conductors 1 and 2.

With its through-hole being appropriately widened, the sleeve body 14 can then be pushed onto one of the cable ends. However, this can also be done even before the described treatment of the cable ends or at any time after completion of one of the stated processes. The screening electrode 13 is then pushed onto the insulation 5 or 6 on one of the cables.

The two conductors 1 and 2 in the cables 3 and 4 are then electrically conductively connected to one another using a known technique. The screening electrode 13 is then pushed over the junction point of the two conductors 1 and 2 until it has reached the position that can be seen in FIG. 2 in which it rests on the one hand on the insulation 5 and on the other hand on the insulation 6. Finally, the sleeve body 14 is pushed to its final position in which its control funnels 15 and 16 rest with an interference fit on the outer conductive layers 7 and 8 of the two cables 3 and 4.

Once the fitting of the sleeve body 14 has been completed, outer sheathing is fitted, for example, over it and can advantageously be formed in the same way as the sheathing on the cables 3 and 4, including their outer sheath 9. Electrical screens which are present in the structure of the cables 3 and 4 are connected through in sheathing such as this. Instead of the sheathing, a metal housing with an insulating sheath can also be fitted around the sleeve body 14.

I claim:

1. Apparatus for a connecting point between two electrical high-voltage cables, each of the cables having an electrical conductor, an inner conductive layer which surrounds the same, an insulation which surrounds the inner conductive layer, and an outer conductive layer which surrounds the insulation, as well as a sheath which is arranged over the outer conductive layer and in which the conductors, from which the surrounding layers have been removed, are electrically conductively connected to one another, said arrangement covering the connecting point of the two conductors comprising:

electrical screening elements;

an integral, elongated sleeve body, composed of elastic insulating material and having a through-hole; and said sleeve body being equipped at its two axial ends, which are intended for the cable to pass through, with electrical control funnels which, in the mounted position, abut to the outer conductive layers, from which the sheaths have been removed, of the two cables, wherein the internal diameters of the through-hole in the sleeve body at its two axial ends, which are equipped with the control funnels, are for its use in a connecting point of two cables, having an external diameter of their insulation which differs by at least 10 mm, different in a defined manner and adapted to these different external diameters.

2. Apparatus according to claim 1, wherein the difference between the internal diameters of the through-hole at the two axial ends of the sleeve body is equal to the difference between the external diameters of the insulation on the two cables.

3. Apparatus according to claim 1, wherein the through-hole in the sleeve body has, at its ends, an internal diameter which is smaller in size than the insulation on the two cables, requiring that the through-hole be widened by at least 8% in order to achieve the fitted position.

4. Apparatus according to claim 1, wherein the sleeve body is composed of an ethylene-propylene-terpolymer or of silicone rubber.

5. Apparatus according to claim 1, wherein, in order to form the control funnels, the axial ends of the sleeve body are composed of ethylene-propylene-terpolymer or silicone rubber that has been made electrically conductive.

\* \* \* \* \*